United States Patent [19]

Matsui et al.

[11] Patent Number: 4,924,210
[45] Date of Patent: May 8, 1990

[54] METHOD OF CONTROLLING COMMUNICATION IN AN ID SYSTEM

[75] Inventors: Kenji Matsui, Nagaokakyo; Yasuo Uchida, Takatsuki, both of Japan

[73] Assignee: Omron Tateisi Electronics Company, Hanazono, Japan

[21] Appl. No.: 168,775

[22] Filed: Mar. 16, 1988

[30] Foreign Application Priority Data

Mar. 17, 1987 [JP] Japan .................................. 62-63469
Mar. 17, 1987 [JP] Japan .................................. 62-63470

[51] Int. Cl.$^5$ ............................................ G08B 13/14
[52] U.S. Cl. ..................................... 340/572; 340/505; 340/825.54
[58] Field of Search ........... 340/572, 551, 505, 825.54, 340/825.71, 825.72, 825.57, 825.65, 825.69, 825.34, 825.31, 825.2, 825.21, 825.14, 825.07

[56] References Cited

U.S. PATENT DOCUMENTS 4,471,345 9/1984 Barrett, Jr. .......................... 340/572

Primary Examiner—Glen R. Swann, III
Assistant Examiner—Thomas J. Mullen, Jr.
Attorney, Agent, or Firm—Foley & Lardner, Schwartz, Jeffery, Schwaab, Mack, Blumenthal & Evans

[57] ABSTRACT

A memory of a data carrier attached to an article to be identified stores a classification code indicative of the data carrier's own communication protocol. Plural types of communication protocols are registered, in correspondence with the classification codes thereof, in the memory of a controller capable of communicating with the data carrier. Upon receiving a classification code transmitted by the data carrier, the controller selects from its memory a communication protocol indicated by the received classification code and then executes communication with the data carrier by using the selected communication protocol.

10 Claims, 6 Drawing Sheets

| PROTOCOL CLASSIFICATION CODE | TYPE OF DATA CARRIER | MEMORY RANGE |
|---|---|---|
| | | |

Fig. 4

| PROTOCOL CONTENT \ CLASSIFICATION CODE | | A | B | C | D |
|---|---|---|---|---|---|
| PHYSICAL LEVEL | TRANSMISSION SPEED | 9600 BPS | 9600 BPS | 19.2KBPS | 19.2KBPS |
| | ERROR DETECTION | VERTICAL PARITY | VERTICAL PARITY | VERTICAL PARITY | VERTICAL PARITY |
| | DATA CONFIGURATION | 8 BITS + 1 PARITY | 8 BITS + 1 PARITY | 8 BITS + 1 PARITY | 8 BITS + 1 PARITY |
| | SYNCHRONIZING METHOD | SYNC BIT | START-STOP | SYNC BIT | START-STOP |
| DATA LINK LEVEL | TRANSMISSION CODE | TOTAL CODE | TOTAL CODE | TOTAL CODE | TOTAL CODE |
| | COMMAND TYPE | SYSTEM a READ (EXPAND) WRITE (EXPAND) STATUS c | SYSTEM b | SYSTEM a | SYSTEM b |
| | COMMAND FORMAT | FORMAT a CODE SYSTEM HORIZONTAL PARITY STATUS | FORMAT b | FORMAT a | FORMAT b |
| | COMMAND RESPONSE SEQUENCE | SEQUENCE a | SEQUENCE b | SEQUENCE a | SEQUENCE b |
| | PAGE UNIT | (BYTES) | (BYTES) | (BYTES) | (BYTES) |
| | RESPONSE TIME MONITORING TIMER | (SECONDS) | (SECONDS) | (SECONDS) | (SECONDS) |
| | TYPE OF DATA CARRIER | READ ONLY READ/WRITE WITH/WITHOUT BATTERY | READ ONLY READ/WRITE WITH/WITHOUT BATTERY | READ ONLY READ/WRITE WITH/WITHOUT BATTERY | READ ONLY READ/WRITE WITH/WITHOUT BATTERY |
| | MEMORY RANGE | | | | |

METHOD OF CONTROLLING COMMUNICATION IN AN ID SYSTEM

BACKGROUND OF THE INVENTION

1. Field of the Invention:

This invention relates to an ID system communication control method through which it is possible to control communication between a controller and a plurality of data carriers having different communication protocols.

2. Description of the Prior Art:

ID (identification) systems are available for identifying the types of assembly parts, manufactured parts and semi-fabricated products delivered on a conveyor or the type of tool on a machine tool, by way of example. One type of such an ID system which has recently been considered employs data carrier elements affixed to these articles. Each data carrier contains a memory in which specific data from a controller can be written or from which data can be read. In an ID system of this type, a large number of the data carriers arrive at a single ID controller to have data read or written. This ID system is premised on the fact that the communication between the ID controller and the data carriers will use an identical communication protocol. An ID system having a controller capable of communicating with a plurality of data carriers having different communication protocols has not been proposed heretofore.

Thus, an ID system in which a controller is capable of communicating with a plurality of data carriers having different communication protocols does not yet exist. However, as ID systems spread and become more common, it is inevitable that data carriers of a variety of types, i.e. of different communication protocols, will appear on the market. Thus, developers of ID systems will be pressed to provide communication control systems in which one and the same controller is capable of communicating with any type of data carrier, regardless of its communication protocol, without imposing limitations upon the data carriers used.

SUMMARY OF THE INVENTION

Accordingly, an object of the present invention is to provide an ID system in which the same controller can communicate with a variety of data carriers even if they have different communication protocols, as well as a method of controlling communication in such an ID system.

Another object of the present invention is to provide a data carrier and a controller used in the aforementioned ID system.

A further object of the present invention is to provide a system in which a controller is capable of communicating with a variety of data carriers having different transmission speeds.

According to the present invention, a method of controlling communication in an ID system in which an exchange of data is carried out between a controller and plural types of data carriers having respective internal memories and different communication protocols comprises the steps of: previously registering the different types of communication protocols of the plurality of data carriers in a memory of the controller in correspondence with classification information of the communication protocols; previously registering in the memory of each data carrier the classification information of its own communication protocol; causing the controller to receive classification information sent by a data carrier at the beginning of communication; causing the controller to select a corresponding communication protocol from its memory using the received classification information; and causing the controller to communicate with the corresponding data carrier in accordance with the selected communication protocol.

Thus, if a communication protocol is within the range of the plural types of communication protocols registered in the controller memory, the controller will be capable of communicating with any data carrier that arrives regardless of the communication protocol thereof. Accordingly, even if the type of data carrier changes, the original controller can be used without modification. This is advantageous economically.

When a data carrier is initially reset, the classification information of the communication protocol is sent to the controller. If the data carrier is of the type in which operating power for communication with the controller is supplied by the controller at the time of communication, the controller turns the power supplied to the data carrier from the off state to the on state, thereby initially resetting the data carrier.

When a data carrier is initially reset, the data carrier sends the controller a synchronizing character signal for deciding the transmission speed of the communication between the data carrier and the controller. In accordance with the present invention, a controller for communicating with a data carrier attached to an article to be identified comprises: means for initially resetting the data carrier; means for receiving and demodulating a modulated synchronizing character signal sent by the data carrier when the data carrier is initially reset; and means for detecting signal transmission speed from the demodulated signal.

Thus, regardless of the transmission speed of a data carrier, the controller is capable of detecting the transmission speed and producing a synchronizing clock signal. This makes proper communication possible with data carriers having various transmission speeds.

Other features and advantages of the present invention will be apparent from the following description taken in conjunction with the accompanying drawings.

BRIEF DESCRIPTION OF THE DRAWINGS

FIG. 4 illustrates examples of a plurality of communication protocols registered in a memory of the ID controller;

DESCRIPTION OF THE PREFERRED EMBODIMENT

An embodiment of the present invention will now be described in detail with reference to the drawings.

Figures 1, 5:
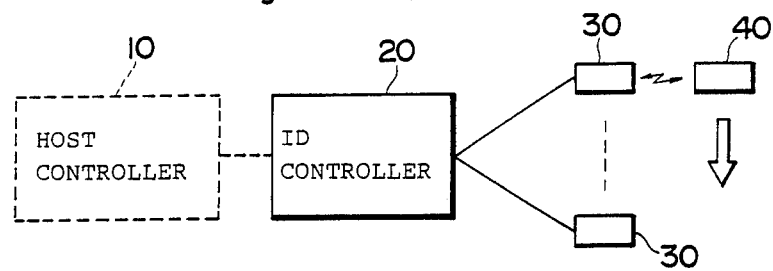
FIG. 1 is a block diagram illustrating the overall construction of an ID system.
FIG. 5 is a view illustrating the format of communication protocol identification information stored in a memory of the data carrier.

FIG. 1 is a block diagram illustrating an ID (identification) system embodying the present embodiment.

The ID system of FIG. 1 includes a data carrier 40 attached for example, to an assembly conveyed on a conveyor or to a tool on a machine tool. The data carrier 40 is composed of a single chip IC and has internal memory means such as an EE PROM. The memory means is adapted to store data conforming to the article to which the data carrier 40 is attached. In FIG. 1, an arrangement is imagined in which an ID controller 20 has a plurality of read/write heads 30, with a variety of the data carriers 40 arriving at the read/write heads 30 in respectively independent systems. The read/write heads 30 are fixed at suitable locations. When a data carrier 40 arrives near a read/write head 30, the ID controller 20 communicates with the data carrier 40 via the head 30. More specifically, in response to a command from a host controller 10, the ID controller 20 acts through the read/write head 30 to write data into, or read data out of, the memory means of the data carrier 40 which approaches the read/write head 30.

Figure 2:
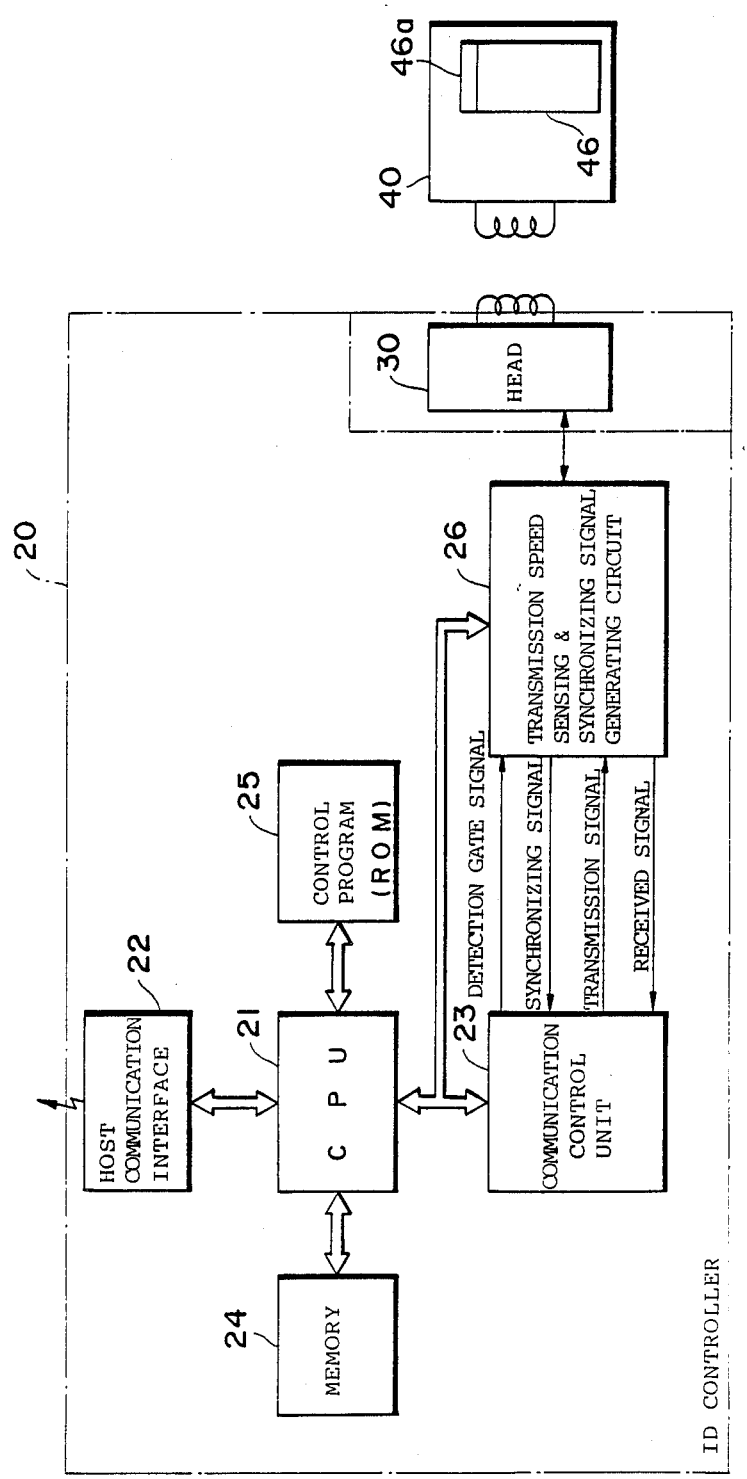
FIG. 2 is a block diagram illustrating an example of the construction of an ID controller used in the ID system.

As shown in FIG. 2, the ID controller 20 includes a host communication interface 22 for communicating with the host controller 10, a ROM 25 for storing a control program for overall control, a CPU 21 for executing a control operation in accordance with the program, a communication control unit 23 for performing an exchange of data with the data carriers 40, a memory 24 for storing the contents of a plurality of communication protocols, which are individually possessed by the data carriers 40, in relation to classification codes (or memory addresses if desired) of the protocols, and a transmission speed sensing and synchronizing signal generating circuit 26 for detecting the speeds at which data are read out of the data carriers 40 and for outputting a synchronizing clock signal. In FIG. 2, only one head 30 is shown for the sake of simplicity.

FIG. 4 illustrates an example of communication protocols set in the communication protocol storage memory 24 of ID controller 20. Four types of communication protocols A, B, C and D are exemplified. The contents of each communication protocol are divided into a physical level and data link level. The type of communication protocol used by a data carrier which has approached the head 30 is identified by a classification code (the aforementioned A, B, C or D) contained in protocol identification information transmitted by the data carrier. Using the communication protocol of the type specified by the identified classification code, the ID controller 20 communicates with the data carrier 40 having this protocol. In the table of FIG. 4, the type of data carrier and the memory range in the data link level are contained in the protocol identification information transmitted by the data carrier 40. This information is stored in this table after being received.

Figure 3:
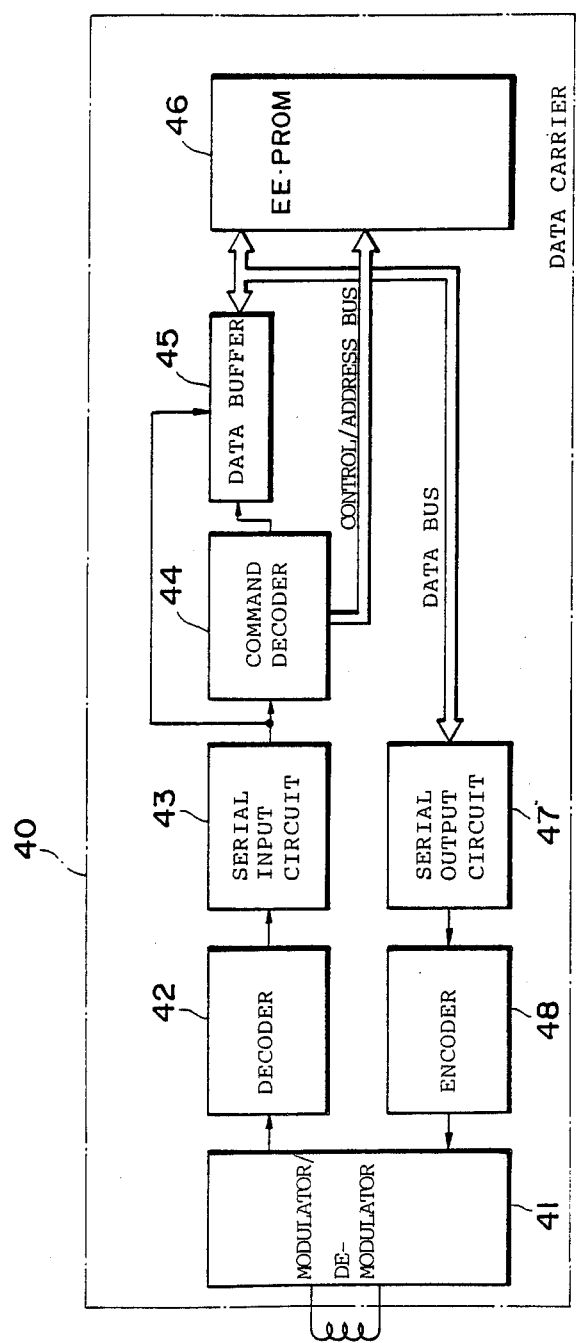
FIG. 3 is a block diagram illustrating an example of the construction of a data carrier used in the ID system.

As shown in FIG. 3, the data carrier 40 includes a modulator/demodulator circuit 41 electromagnetically coupled to the read/write head 30 of the ID controller 20, a decoding circuit 42 for decoding a received signal outputted b the modulator/demodulator circuit 41, a serial input circuit 43, a command decoder 44 for decoding a received command, a data buffer 45 for temporarily storing received data, an EE PROM 46 in which data to be stored is written or from which data is read, a serial output circuit 47 for outputting data read out of the EE PROM 46, and an encoding circuit 48 for encoding the read data before applying the data to the modulator/demodulator circuit 41. The writing of data in the EE PROM 46 is so arranged that data can be rewritten in units of e.g. one page (eight bytes) using the data buffer 45.

The data carrier 40 may have an internal battery for supplying operating power to the various circuits mentioned above, or the operating power may be obtained through the electromagnetic coupling with the head 30. Another option would be for some of the operating power to be supplied by an internal battery and for the rest to be received from the ID controller 20.

The head 30 of the ID controller 20 includes an oscillator circuit having a coil and sends the transmission data by varying the oscillation frequency of the oscillator circuit or causing the oscillator circuit to oscillate in intermittent fashion. The modulator/demodulator circuit 41 of the data carrier 40 includes a resonance circuit having a coil and receives the data in the form of the signal induced in the resonance circuit. In a case where data is transmitted from the data carrier 40 to the ID controller 20, a signal from an oscillator circuit in the data carrier 40 induces a signal in a resonance circuit possessed by the head 30. Alternatively, the load of the oscillator circuit in the head 30 can be changed by varying the resonant frequency of the resonance circuit in data carrier 40.

The EE PROM 46 of data carrier 40 has an identification information storage area (leading address area 46a, see FIG. 2) in which the communication protocol identification information, namely classification data indicating which communication protocol the data carrier 40 is using, is stored. The format of the communication protocol identification information is illustrated in FIG. 5. This information includes the protocol classification code, namely codes indicating the distinction among A, B, C and D in FIG. 4, type of data carrier, e.g. read only, read/write, presence or absence of battery, and memory range, namely the address range and memory capacity.

Figure 6:
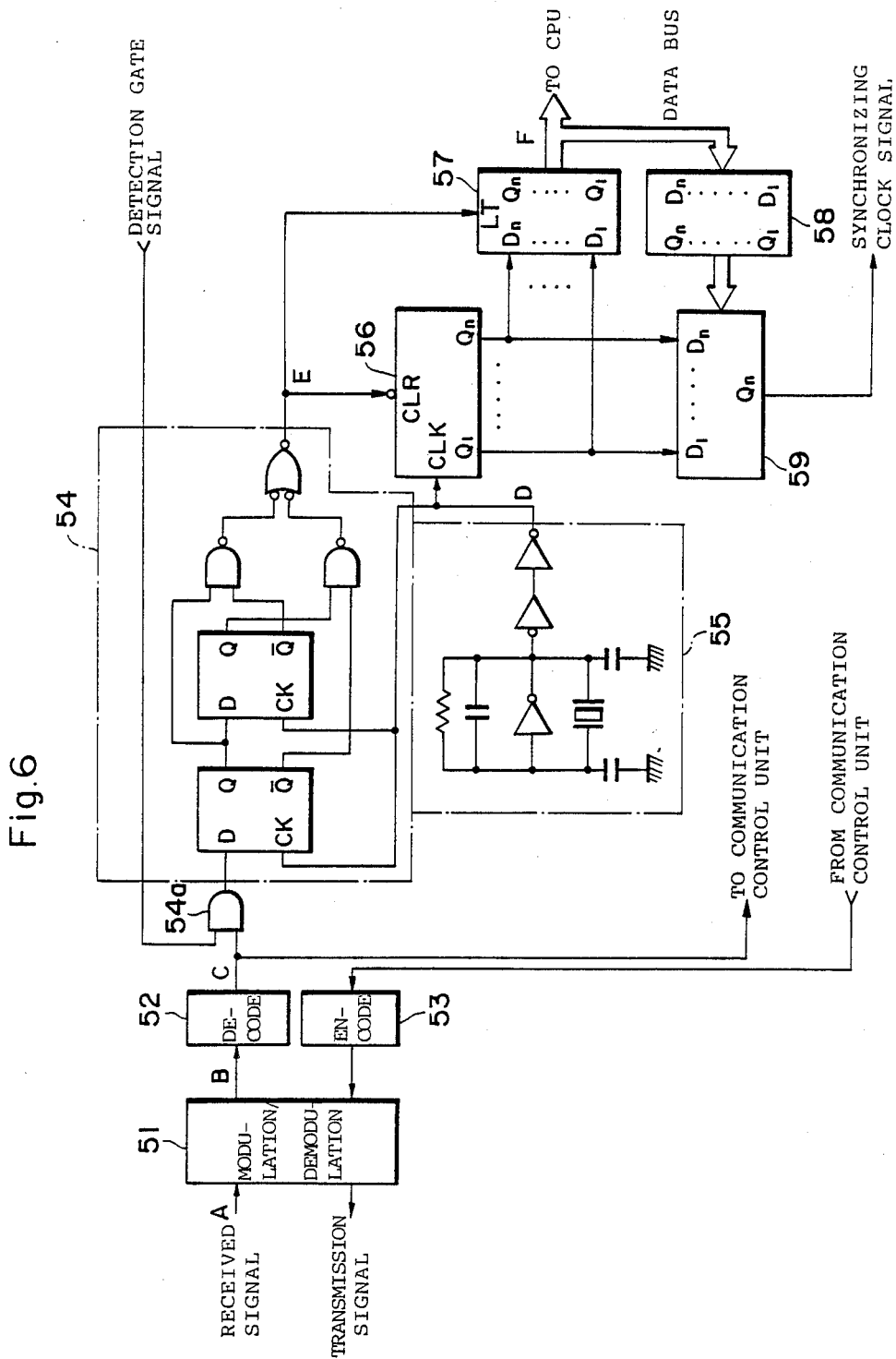
FIG. 6 is a block diagram of circuitry for sensing transmission speed and for generating a synchronizing signal in the ID controller.

As shown in FIG. 6, the transmission speed sensing and synchronizing signal generating circuit 26 of ID controller 20 includes a modulator/demodulator circuit 51, a decoding circuit 52, an encoding circuit 53, a sensing gate circuit 54a for controlling the application of the output signal from decoding circuit 52 to an edge detecting circuit 54, the edge detecting circuit 54, which is for detecting the leading and trailing edges of a pulse signal outputted by the decoding circuit 52, an oscillator 55 for generating a pulse signal having a constant frequency $f_c$, a counter 56 which counts the pulse signals outputted by the oscillator 55, and which is cleared by a detection pulse signal from the edge detecting circuit 54, a latch circuit 57 for latching the count output of the counter 56 each time a detection pulse is outputted by the edge detecting circuit 54, a latch circuit 58 for latching any input signal from the CPU 21 such as a signal representing a value which is one-half the count value indicated by the output data of the latch circuit 57, and a multiplexer 59 for selecting an output of the counter 56 in accordance with the data latched in the latch circuit 58, and for outputting a synchronizing clock signal.

The operation of the ID controller 20 and data carrier 40 for a case where an auto-read command is supplied by the host controller 10 in the ID system of the illustrated embodiment will now be described with reference to FIG. 8. The auto-read command is one which instructs the data in EE PROM 46 accessed by an address contained in the command to be read out of the data carrier 40.

Upon receiving the auto-read command from the host controller 10, the ID controller 20 initially resets the data carrier 40, receives the synchronizing character and the communication protocol identification information from the data carrier 40, identifies the transmission speed, selects the corresponding communication protocol from the memory 24 and thereafter communicates with the data carrier 40 in accordance with the communication protocol. The details of this operation will now be set forth.

Figure 8:
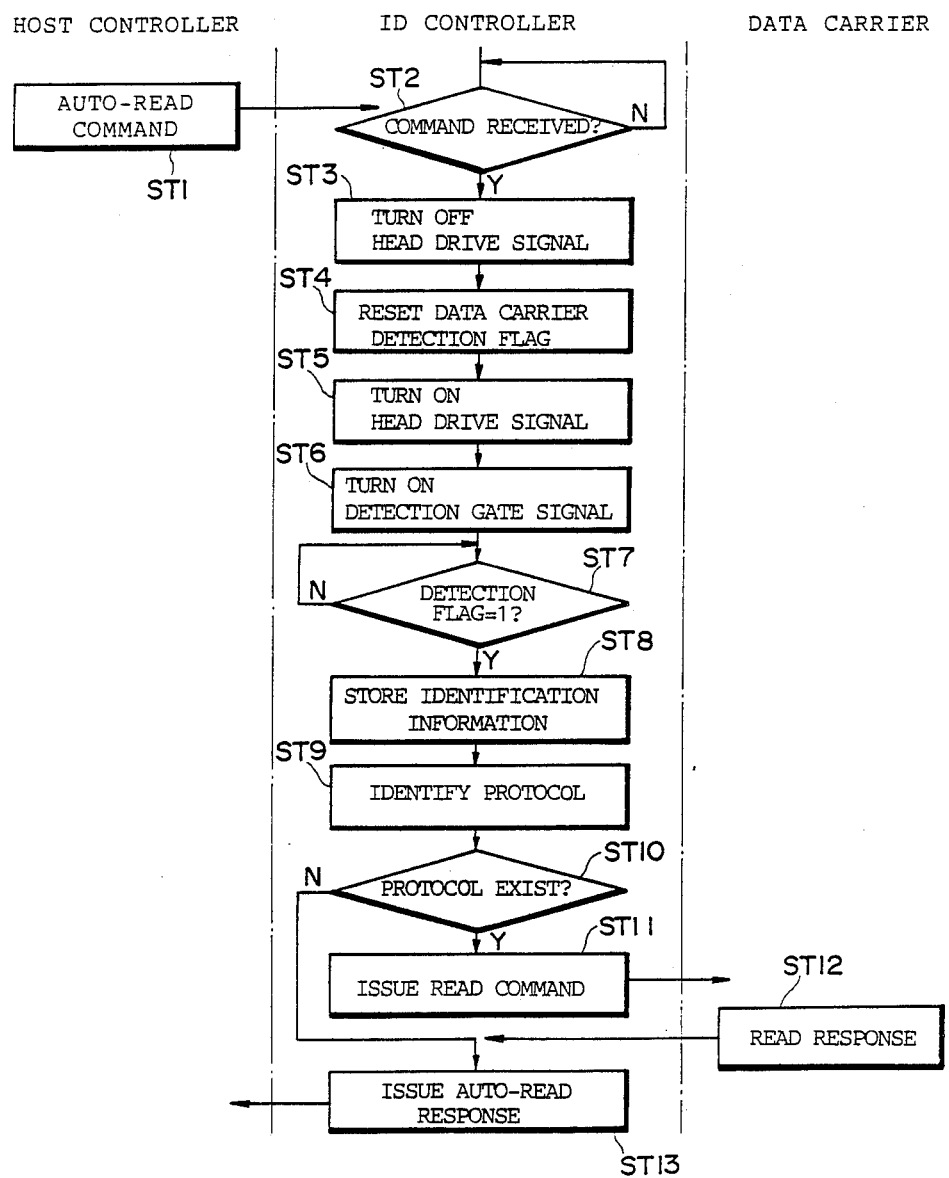
FIG. 8 is a flowchart illustrating the overall operation of the ID system, particularly the operation of the ID controller.

With reference to FIG. 8, the auto-read command is issued by the host controller 10 at a step ST1. When this occurs, the ID controller 20 receives the auto-read command, resulting in a YES decision at a step ST2. Next, the ID controller 20 turns off a head drive signal for the read/write head 30 at a step ST3 and resets a data carrier detection flag at a step ST4. This is followed by a step ST5, at which the ID controller 20 turns on the drive signal of the read/write head 30 again and simultaneously turns on a detection gate signal to open the gate 54a.

When the head 30 of the ID controller 20 is turned from off to on, the data carrier receives the oscillating signal from the head 30 if this data carrier 40 draws near the head 30 at this time. This means that the data carrier 40 will be supplied with the operating electric power. In other words, the data carrier 40 attains a state equivalent to that which would be attained by closing a power switch. In response, the data carrier 40 is initially reset and the communication protocol identification information in the leading address area 46a of the EE PROM 46 is read out. The data carrier 40 encodes and transmits the synchronizing character signal and then encodes and transmits the communication protocol identification information (data) that has been read.

Figure 7:
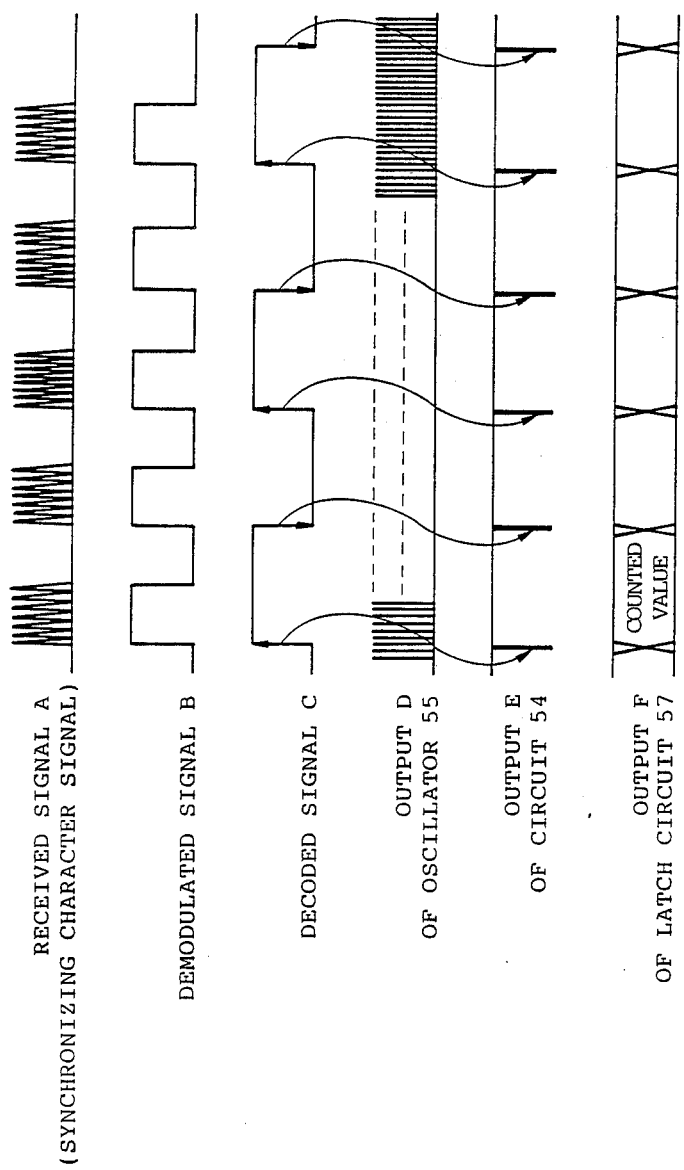
FIG. 7 is a timing chart useful in describing the operation of the transmission speed sensing and synchronizing signal generating circuitry of FIG. 6.

The synchronizing character signal is composed of eight bits. A portion of this synchronizing character signal received by the ID controller 20 is shown at A in FIG. 7. The ID controller 20 detects the transmission speed of the data carrier 40 on the basis of the first few bits of the signal A.

This detection of the transmission speed is performed by the transmission speed sensing and synchronizing signal generating circuit 26. The operation of this circuit will now be described with reference to FIGS. 6 and 7.

First, the the received signal A is inputted to the modulator/demodulator circuit 51 in order to be demodulated into and outputted as a demodulated signal B. This demodulated signal is a special signal having on/off times related by the ratio 1:1. The demodulated signal is decoded into and outputted as a signal C by the decoding circuit 52. The decoded signal C has its leading and trailing edges detected by the edge detecting circuit 54, which outputs a pulse signal E at each leading and trailing edge of the signal C. The pulse signal E has a repetition rate corresponding to the transmission speed of the data carrier 40.

Meanwhile, the oscillator 55 oscillates continuously to produce a pulse signal D having a predetermined frequency $f_c$. This signal is inputted to the counter 56 and is counted thereby. The count recorded in counter 56 is cleared by the output signal E of edge detecting circuit 54, after which the counter 56 is restarted to repeat the counting operation. The output signal E of edge detecting circuit 54 also causes the count of counter 56 to be latched in the latch circuit 57. Accordingly, the latch circuit 57 outputs the updated contents of counter 56. This counted value $C_n$ is a signal conforming to the transmission speed of the data carrier 40. The controller 20 thus senses the transmission speed of the data carrier 40. The transmission speed has a set value of 9600 BPS or the like. Even if the count $C_n$ does not exactly correspond to this set value, it will correspond to a value substantially close to the set value and therefore can be regarded as same.

The CPU 21 of ID controller 20 provides the latch circuit 58 with a value conforming to the count $C_n$, e.g. a value that is one-half of the count. The value latched in the latch circuit 58 is applied as a selection signal to the multiplexer 59, which is receiving the count from the counter 56. At the moment the count from counter 56 becomes equal to the value of the selection signal, the multiplexer 59 selects a signal representing the prevailing count output and outputs this signal as the synchronizing clock signal. In this example, the synchronizing clock signal has a waveform the same as that of the demodulated signal B.

The synchronizing clock signal is applied to the communication control unit 23, as is the decoded signal from the decoding circuit 52. The communication control unit 23 reads the inputted decoded signal in synchronization with the synchronizing clock signal, whereby the data transmitted by the data carrier 40 can be discriminated. The data transmitted from the ID controller 20 to the data carrier 40 is also expressed by a signal synchronized to the synchronizing clock signal in the communication control unit 23 and is applied to the encoding circuit 53. The data is eventually transmitted by the modulator/demodulator circuit 51. Thus, the ID controller 20 communicates with the data carrier 40 in sync with the clock signal. In other words, the ID controller 20 is capable of communication matched to the transmission speed of the data carrier 40.

The data carrier 40 transmits the signal representing the communication protocol identification information following the abovementioned synchronizing character signal. Therefore, the communication protocol identification signal is inputted to the communication control unit 23 via the modulator/demodulator circuit 51 and decoding circuit 52. When this identification information is received, the detection flag of data carrier 40 is set. As a result, a YES decision is rendered at a step ST7 in FIG. 8 and the communication protocol identification information received is saved in a buffer or memory at a step ST8. The communication protocol indicated by the protocol classification code in this identification information is selected in memory 24 at a step ST9. Thereafter, the ID controller 20 and the data carrier 40 communicate with each other in accordance with the selected protocol. For example, if B is the protocol of the data carrier 40, data communication is subsequently performed using the communication protocol B in memory 24.

A step ST10 calls for a determination as to whether the communication protocol indicated by the communication protocol identification information transmitted by the data carrier 40 is set in the memory 24, or in other words, whether this communication protocol is present in the memory 24. If the protocol is present, then the ID controller 20 sends a read command to the data carrier 40 at a step ST11. In response to the read command, the data carrier 40 reads the prescribed data out of the EE PROM 46 and transmits the data to the ID controller 20, thereby performing a read response (step ST12).

If the protocol is not present, namely if the communication protocol identification information sent by the data carrier 40 indicates a communication protocol not present in the memory 24, a NO answer is received at the step ST10 and the ID controller 20 returns an auto-read response indicative of this fact to the host controller 10 at a step ST13. Further, even when the data carrier 40 responds to a normal read response, the ID controller 20 returns an auto-read response indicative of this fact to the host controller 10, as mentioned above.

In the foregoing embodiment, operation has been described for a case where an auto-read command from the host controller 10 is inputted to the ID controller 20. However, as to whether or not some communication protocol is selected, the invention is not limited to an auto-read command, and operation would be the same if an ordinary read command from the host controller 10 were applied to the ID controller 20.

Further, in the foregoing embodiment, the communication protocols classified and defined are of four types, namely A, B, C and D, and the physical level and data link level are as illustrated in FIG. 4. However, definitions and classifications of selectable communication protocols can be selected at will and the invention is not limited to the foregoing embodiment.

What is claimed is:

1. A method of controlling communication in an ID system in which an exchange of data is carried out between a controller and plural types of data carriers having respective internal memories and different communication protocols, said method comprising the steps of:
   previously registering the different types of communication protocols of the plurality of data carriers in a memory of said controller in correspondence with classification information of the communication protocols;
   previously registering in the memory of each data carrier the classification information of its own communication protocol;
   causing said controller to receive classification information sent by a data carrier at the beginning of communication;
   causing said controller to select a corresponding communication protocol from its memory using the received classification information; and
   causing said controller to communicate with the corresponding data carrier in accordance with the selected communication protocol.

2. The method according to claim 1, wherein the data carrier is of a type supplied with operating power from said controller when the data carrier communicates with said controller;
   said controller initially resets the data carrier by turning the power supplied thereto from off to on; and
   said data carrier transmits communication protocol classification information to said controller when it is initially reset.

3. The method according to claim 2, wherein when the data carrier is initially reset, said data carrier transmits a synchronizing character signal before it transmits a signal representing the communication protocol classification information.

4. An ID system which exchanges data between a controller and plural types of data carriers having different communications protocols, the data carriers being attachable to articles to be identified and the controller communicating with said data carriers, each said data carrier comprising:
   a memory storing a classification code indicating a communication protocol of the carrier; and
   said controller comprising:
   a memory for previously storing a plurality of communication protocols in correspondence with classification codes thereof;
   means operative, when a classification code transmitted by said data carrier is received, for selecting from the plurality of communications protocols in said memory a communication protocol indicated by the classification code transmitted by the data carrier; and
   means for controlling execution of communication with said data carrier by using the selected communication protocol.

5. A data carrier attachable to an article to be identified and capable of communicating with a controller having a plurality of communication protocols stored in a memory, the protocols corresponding to types of data carriers, comprising:
   a memory storing a classification code indicating a type of data carrier corresponding to one of the plurality of communication protocols; and
   means for transmitting a message when said data carrier is initially reset, said message including a synchronizing character used in order to decide a transmission speed in a communication with said controller, and a classification code read out of said data carrier memory.

6. The data carrier according to claim 5, wherein said means for transmitting the message includes a signal modulating circuit.

7. The data carrier according to claim 5, wherein said means for transmitting the message includes a data encoding circuit and a modulating circuit.

8. A controller for communicating with a data carrier using one of a plurality of communication protocols stored in the controller, the one protocol being identified by the data carrier, the data carrier being attached to an article to be identified, the controller comprising:
   means for initially resetting the data carrier;
   means for receiving and demodulating a modulated synchronizing character signal sent by the data carrier when said data carrier is initially reset; and
   means for detecting signal transmission speed from the demodulated signal.

9. The controller according to claim 8, further comprising means for producing and outputting a synchronizing clock signal on the basis of said demodulated signal.

10. In an ID system which exchanges data between a controller and plural types of data carriers having different communication protocols, a transmission speed detecting apparatus comprising:
   a decoding circuit for decoding a demodulated signal;
   an edge detecting circuit for detecting a leading edge and a trailing edge of an output signal from said decoding circuit;
   a counter which, from a moment it is reset, counts a pulse signal having a constant frequency, and which is reset by an edge detection output from said edge detecting circuit; and
   means for computing transmission speed based on a counted value prevailing immediately prior to resetting of said counter.

* * * * *